(12) United States Patent
Hatanaka et al.

(10) Patent No.: US 10,715,682 B2
(45) Date of Patent: Jul. 14, 2020

(54) ELECTRONIC DEVICE, CONTROL METHOD AND NON-TRANSITORY STORAGE MEDIUM FOR EXECUTING A PROCESS RELATED TO AN INCOMING CALL ACCORDING TO A RESPONSE METHOD

(71) Applicant: KYOCERA Corporation, Kyoto-shi, Kyoto (JP)

(72) Inventors: Akihito Hatanaka, Yokohama (JP); Tomoki Iwaizumi, Yokohama (JP); Hisae Honma, Yokohama (JP); Kousuke Nagase, Yokohama (JP); Tomohiro Sudou, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 0 days.

(21) Appl. No.: 16/524,188

(22) Filed: Jul. 29, 2019

(65) Prior Publication Data

US 2020/0036838 A1    Jan. 30, 2020

(30) Foreign Application Priority Data

Jul. 30, 2018   (JP) ................. 2018-142081

(51) Int. Cl.
*H04M 19/04* (2006.01)
*H04M 3/436* (2006.01)
*H04M 1/57* (2006.01)
*H04M 3/42* (2006.01)

(52) U.S. Cl.
CPC ......... *H04M 19/041* (2013.01); *H04M 1/576* (2013.01); *H04M 3/42042* (2013.01); *H04M 3/42059* (2013.01); *H04M 3/436* (2013.01)

(58) Field of Classification Search
CPC ..... H04W 4/12; H04W 4/14; H04M 3/42059; H04M 3/42042; H04M 3/436; H04M 1/576; H04M 3/4365; H04M 1/72552; H04M 3/42093
See application file for complete search history.

(56) References Cited

U.S. PATENT DOCUMENTS

| 7,873,646 | B2 * | 1/2011 | Yach ................. G06F 9/542 455/412.2 |
| 9,876,904 | B2 * | 1/2018 | Alfano ............. H04M 1/72552 |
| 10,375,123 | B2 * | 8/2019 | Pierce ................ H04L 65/1059 |

FOREIGN PATENT DOCUMENTS

JP    4627520 B2   2/2011

* cited by examiner

*Primary Examiner* — Nam T Huynh
(74) *Attorney, Agent, or Firm* — Hauptman Ham, LLP

(57) ABSTRACT

An electronic device comprising: a display; a communication unit; a storage configured to store response method data in which pre-set keywords and response methods corresponding to incoming calls are associated with each other; and a processor configured to, when an incoming call containing a text message comes in, acquire the response method data that is stored in the storage and execute a process relating to the incoming call according to a response method that is defined in the response method data.

4 Claims, 9 Drawing Sheets

FIG.3

| KEYWORD | | RESPONSE PROCESS | NOTIFYING MODE |
|---|---|---|---|
| 1 | PASS | INCOMING CALL NOTIFICATION | OUTPUTTING CALL ALERT SOUND AND VIBRATING |
| | ACCEPTED | | |
| | RESULT | | |
| 2 | BUSINESS MEETING | MESSAGE REQUESTING PROCESS | - |
| | PRESENTATION | | |
| 3 | NEW YEAR HOLIDAYS | INCOMING CALL NOTIFICATION | OUTPUTTING CALL ALERT SOUND BASED ON KEYWORD SEARCHING |
| ⋮ | ⋮ | ⋮ | ⋮ |
| NONE | | INCOMING CALL NOTIFICATION | NOTIFICATION MODE BEING SET |

9F

ELECTRONIC DEVICE, CONTROL METHOD AND NON-TRANSITORY STORAGE MEDIUM FOR EXECUTING A PROCESS RELATED TO AN INCOMING CALL ACCORDING TO A RESPONSE METHOD

CROSS-REFERENCE TO RELATED APPLICATION(S)

The present application claims priority under 35 U.S.C. § 119 to Japanese Patent Application No. 2018-142081 filed on Jul. 30, 2018, entitled "ELECTRONIC DEVICE, CONTROL METHOD AND CONTROL PROGRAM". The content of which is incorporated by reference herein in its entirety.

BACKGROUND

1. Technical Field

The present application relates to an electronic device, a control method, and a non-transitory storage medium.

2. Description of the Related Art

There is a conventional technology in which, when an outgoing call is made with a caller's mobile phone, text information on, for example, things to talk is entered and transmitted to a partner and the caller's phone number and the text information are displayed when an incoming call corresponding to the outgoing call comes in on the partner's (receiver's) mobile phone.

SUMMARY

It is an object of the present disclosure to at least partially solve the problems in the conventional technology.

An electronic device according to one embodiment includes a display, a communication unit, a storage configured to store response method data in which pre-set keywords and response methods corresponding to incoming calls are associated with each other, and a processor configured to, when an incoming call containing a text message comes in, acquire the response method data that is stored in the storage and execute a process relating to the incoming call according to a response method that is defined in the response method data.

A control method according to one embodiment executed by an electronic device including a display, a communication unit, and a storage is disclosed. The method includes when an incoming call containing a text message comes in, acquiring response method data in which pre-set keywords and response methods corresponding to incoming calls are associated with each other and that is stored in the storage, and executing a process relating to the incoming call according to a response method that is defined in the acquired response method data.

A non-transitory storage medium according to one embodiment stores a control program for causing, when executed by an electronic device including a display, a communication unit, and a storage, the electronic device to execute, when an incoming call containing a text message comes in, acquiring response method data in which pre-set keywords and response methods corresponding to incoming calls are associated with each other and that is stored in the storage, and executing a process relating to the incoming call according to a response method that is defined in the acquired response method data.

The above and other objects, features, advantages and technical and industrial significance of this disclosure will be better understood by reading the following detailed description of presently preferred embodiments of the disclosure, when considered in connection with the accompanying drawings.

BRIEF DESCRIPTION OF THE DRAWINGS

FIG. 3 is a table of exemplary response method data according to the embodiment;

DETAILED DESCRIPTION

Figure 1:
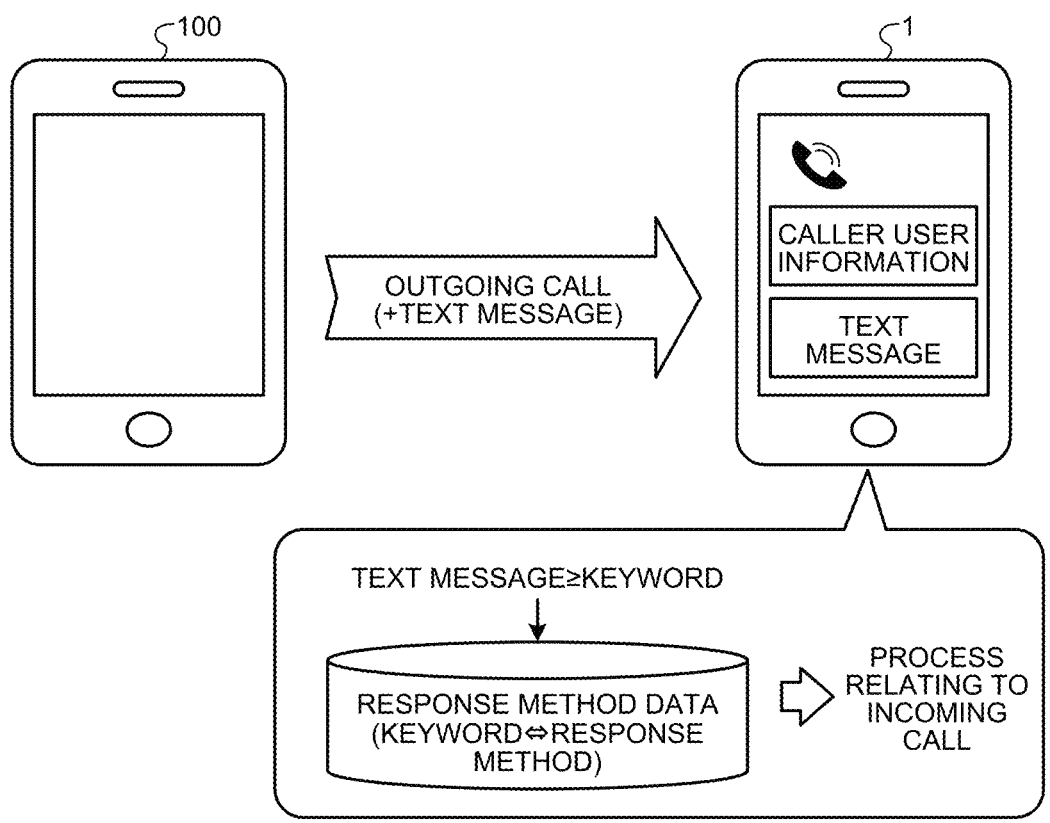
FIG. 1 is a diagram of an overview of a communication system according to an embodiment.

Embodiments according to the present application will be described in detail with reference to the drawings. In the following description, like parts can be denoted with like reference numerals. Furthermore, redundant description can be omitted.

In the technology of displaying a caller's phone number and text information on a receiver's mobile phone, as for convenience to users, there is room for improvement in a process performed by the receiver of the incoming call.

FIG. 1 is a diagram of an overview of a communication system according to an embodiment. The communication system according to the embodiment includes an electronic device 1 having a telephone function and an electronic device 100 having the telephone function. In FIG. 1, when an incoming call containing a text message comes in from the electronic device 100, the electronic device 1 displays the text message contained in the incoming call together with caller user information on a screen to make a notification indicating that an incoming call comes in, which is the overview of the communication system. The communication system includes a server (omitted from FIG. 1) to talk and communicate text messages between the electronic device 1 and the electronic device 100.

The electronic device 1 stores response method data in which pre-set keywords and response methods corresponding to incoming calls are associated with each other. When an incoming call containing a text message comes in, the electronic device 1 acquires the response method data and executes a process relating to the incoming call according to a response method that is defined in the acquired response method data, which is the outline of the electronic device.

Figure 2:
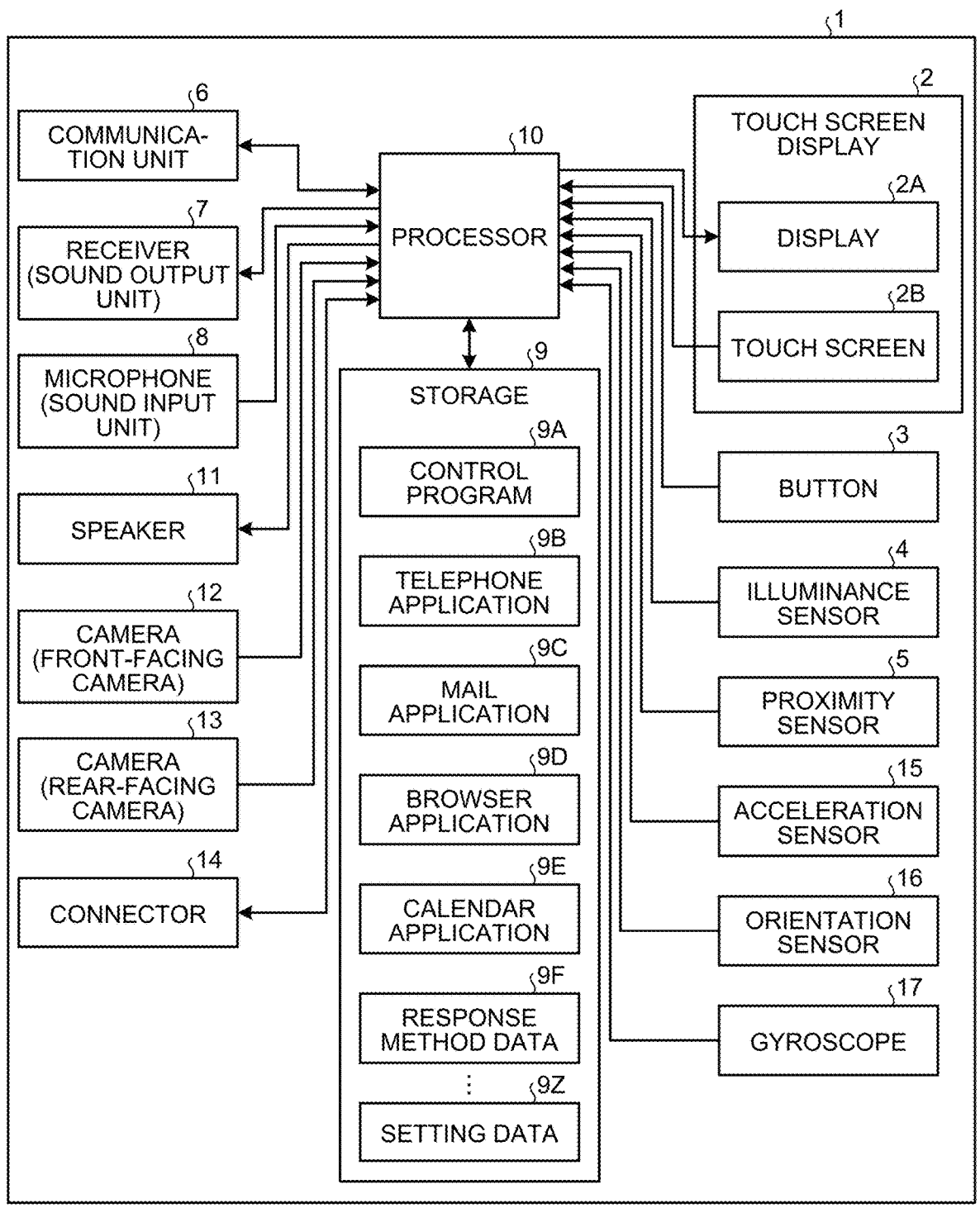
FIG. 2 is a block diagram of an exemplary functional configuration of an electronic device according to the embodiment.

Using FIG. 2, a functional configuration of the electronic device according to the embodiment will be described. FIG. 2 is a block diagram of an exemplary functional configuration of the electronic device according to the embodiment. The electronic device 1 includes a touch screen display 2, a button 3, an illuminance sensor 4, a proximity sensor 5, a communication unit 6, a receiver 7, a microphone 8, a storage 9, a processor 10, a speaker 11, cameras 12 and 13, a connector 14, an acceleration sensor 15, an orientation sensor 16, and a gyroscope 17.

The touch screen display 2 includes a display 2A and a touch screen 2B. The display 2A and the touch screen 2B, for example, may be positioned in a superimposed manner, may be positioned in an aligned manner, or may be positioned in a separated manner. When the display 2A and the touch screen 2B are positioned in a superimposed manner, for example, at least one side of the display 2A need not be along with any side of the touch screen 2B.

The display 2A includes a display device, such as a liquid crystal display (LED), an organic electro-luminescence display (OELD), or an inorganic electro-luminescence display (IELD). The display 2A displays an object, such as texts, an image, a symbol, or a diagram.

The touch screen 2B detects contact or proximity of a finger, a pen, or a stylus pen with or to the touch screen 2B. The touch screen 2B is able to, when multiple fingers, a pen, a stylus pen or the like contacts with or is proximate to the touch screen 2B, detect the position thereof on the touch screen 2B. In the following description, the position in which multiple fingers, a pen, a stylus pen or the like contacts with or is proximate to the touch screen 2B is referred to as "detection position". The touch screen 2B notifies the processor 10 of the contact or proximity of fingers with or to the touch screen 2B together with the detection position. The touch screen 2B may notify the processor 10 of the contact or proximity by notifying the processor 10 of the detection position. The touch screen display 2 including the touch screen 2B is able to execute operations that the touch screen 2B is able to perform. In other words, operations performed by the touch screen 2B may be performed by the touch screen display 2.

The processor 10 determines a gesture type based on at least one of contact or proximity that is detected by the touch screen 2B, a detection position, a change in detection position, a time duration during which contact or proximity continues, an interval between detections of contact or proximity, and the number of times contact is detected. The electronic device 1 including the processor 10 is able to execute operations performed by the processor 10. In other words, operations performed by the processor 10 may be performed by the electronic device 1. Gestures are operations performed with fingers on the touch screen 2B. The operations performed on the touch screen 2B may be performed by the touch screen display 2 including the touch screen 2B. Gestures determined by the processor 10 via the touch screen 2B include, for example, touch, long touch, release, tap, double tap, long tap, drag, flick, pinch-in, and pinch-out; however, the gestures are not limited thereto.

The processor 10 performs operations according to the gestures that are determined via the touch screen 2B, thereby realizing intuitive and easy-to-use operability to users. Operations performed by the processor 10 according to the determined gestures may differ according to the screen that is displayed on the display 2A.

A detection method employed by the touch screen 2B may be any method, for example, a capacitive method, a resistive method, a surface acoustic wave method, an infrared method, a load detection method, or the like. The touch screen display 2 is an exemplary display.

The button 3 accepts an operation input from the user. The button 3 includes any number of buttons. The processor 10 cooperates with the button 3 to detect operations on the button 3. Operations on the button 3 include, for example, click, double click, triple click, push and multi-push; however, operations on the button 3 are not limited thereto. The button 3 may be assigned with various functions, for example, a menu button, a power-on button, power-off button (power button), and a reset button. The button 3 may be assigned with a function of executing a sound input process.

The illuminance sensor 4 detects an illuminance. An illuminance is a value of a light flux that is incident on a unit area on a measurement surface of the illuminance sensor 4. The illuminance sensor 4, for example, is used to adjust the brightness of the display 2A.

The proximity sensor 5 performs contactless detection of presence of a nearby object. The proximity sensor 5 includes a light-emitting device that emits infrared light and a light-receiving device that receives the reflected infrared light that is emitted from the light-emitting device. The illuminance sensor 4 and the proximity sensor 5 may be configured as a single sensor.

The communication unit 6 communicates wirelessly. Wireless communication standards supported by the communication unit 6 include, for example, cellular-phone communication standards, such as 2G, 3G, 4G and 5G, and short-distance wireless communication standards. Cellular-phone communication standards include, for example, LTE (Long Term Evolution), W-CDMA (trademark) (Wideband Code Division Multiple Access), CDMA 2000, PDC (Personal Digital Cellular), GSM (trademark) (Global System for Mobile communications), and PHS (Personal Handyphone System).

Short-distance wireless communication standards supported by the communication unit 6 include, for example, WiMAX (trademark) (Worldwide interoperability for Microwave Access), IEEE802.11, Bluetooth (trademark), IrDA (Infrared Data Association), NFC (trademark) (Near Field Communication), and WPAN (Wireless Personal Area Network). The communication unit 6 may support at least one of the above communication standards.

The communication unit 6 is able to realize communication of various types of data by communicating with an external device, such as a smartphone, a tablet, a digital camera, or a cloud storage. The communication unit 6 is an exemplary communication unit.

The receiver 7 outputs a sound signal from the processor 10 as sound. The receiver 7, for example, is used to output voice of the partner during a talk on the phone. The microphone 8 converts the voice of the user that is input into a sound signal and transmits the sound signal to the processor 10. The microphone 8, for example, is used to input the voice of the user during a talk on the phone.

The storage 9 stores a program and data. The storage 9 may be used as a work area in which the result of processing performed by the processor 10 is temporarily stored. The storage 9 may include any non-transitory storage medium, such as a semiconductor storage medium or a magnetic storage medium. The storage 9 may include multiple types of semiconductor storage media. The storage 9 may include a combination of a storage medium, such as a memory card, an optical disk, or a magneto-optical disk, and a device that reads the storage medium. The storage 9 may include a storage device that is used as a temporary storage area, such as a random access memory (RAM).

The program that is stored in the storage 9 contains an application that is executed on the foreground or on the background and a basic program that supports operations of the application. When executed on the foreground, the application displays a screen according to the application on the display 2A. The basic program may contain, for example, an operating system (OS) and firmware. The program may be installed in the storage 9 via wireless communication performed by the communication unit 6 or a non-transient storage medium.

The basic program that is stored in the storage 9 enables provision of functions for implementing a process relating to various operations of the electronic device 1. The functions provided by the basic program include a function of adjusting the brightness of the display 2A based on the result of detection performed by the illuminance sensor 4. The functions provided by the basis program include a function of invalidating an operation on the touch screen 2B based on the result of detection performed by the proximity sensor 5. The functions provided by the basis program include a function of controlling communication with an external device connected via the connector 14. The functions provided by the basis program include a function of performing various types of control, such as changing information displayed on the display 2A, according to the gesture that is determined based on the result of detection performed by the touch screen 2B.

The storage 9 stores a control program 9A, a telephone application 9B, a mail application 9C, a browser application 9D, a calendar application 9E, response method data 9F, setting data 9Z, etc.

The control program 9A enables provision of various functions for realizing a process unique to the electronic device 1 according to the embodiment in cooperation with various applications. The control program 9A may be implemented with an application that is created dedicatedly or may be implemented by an add-on of an existing program.

The control program 9A enables provision of a function of, when an incoming call containing a text message comes in, executing a process relating to the incoming call according to a response method that is defined in the response method data 9F in cooperation with a telephone application 9B. The functions provided by the control program 9A may include a function of displaying a text message contained in the incoming call together with the caller user information on the screen to make a notification indicating that the incoming call comes in. The communication method corresponding to the telephone application 9B according to the embodiment may correspond to at least any one of a full duplex communication method and a half duplex communication method.

FIG. 3 is a table representing exemplary response method data according to the embodiment. As represented in FIG. 3, the response method data 9F that is stored in the storage 9 stores pre-set keywords and response methods corresponding to incoming calls in association with each other.

In the response method data 9F, the same response method may be associated with multiple different keywords. In the response method data 9F, a response method associated with a keyword includes content of a response process performed when an incoming call comes in and a notification mode in which a notification is made when an incoming call comes in.

The response method data 9F illustrated in FIG. 3 exemplifies "incoming call notification" and "a message requesting process" as content of the response process that is associated with keywords. "Incoming call notification" is a process of notifying the user that an incoming call comes in. "Message requesting process" is a process of transmitting a message request for requesting for transmission of a message by data communication.

In the response method data 9F illustrated in FIG. 3, "outputting call alert sound and vibrating", "outputting call alert sound based on keyword searching" and "notification mode being set", etc., are exemplified as the notification mode in the case where the response process is "incoming call notification". "Outputting call alert sound and vibrating" is a notification mode in which the electronic device 1 is caused to sound or move by outputting a call alert sound or vibrating. "Outputting call alert sound based on keyword searching" is a notification mode in which, for example, music data stored in the storage 9 is searched for music that matches the keyword and the searched music is output as a call alert sound instead of the call alert sound being set. The notification mode may include, in addition to the setting example in FIG. 3, for example, displaying, on the touch screen display 2, a picture or a video image obtained by searching the video image data that is stored in the storage 9 based on the keyword.

According to the response method data 9F illustrated in FIG. 3, in the case where no keyword is contained in a text message contained in an incoming call, "incoming call notification" is defined as content of the response process and "notification mode being set" is defined as the notification mode. The notification mode being set includes, for example, outputting a call alert sound, illuminating, and vibrating.

The telephone application 9B enables provision of a function for executing a process of making an outgoing call by wireless communication, accepting a call, and talking. The mail application 9C enables provision of an electronic mail function for creating, transmitting, receiving, and displaying an electronic mail, etc. The browser application 9D enables provision of a WEB browsing function for displaying WEB pages, etc. The calendar application 9E enables provision of a calendar function for schedule management, etc.

The setting data 9Z contains information on various types of setting on operations of the electronic device 1. The setting data 9Z contains data that is used for various types of processing executed by the control program 9A. The storage 9 can store, in addition to those represented in FIG. 2, address book data in which personal information, such as names of other users (for example, the user of the electronic device 100), phone numbers, mail addresses and addresses, music data in which multiple sets of music are recorded, and video image data in which pictures and videos are recorded.

The electronic device 1 may cooperate with a cloud storage via the communication unit 6 and access files and data that the cloud storage stores. The cloud storage may store part of or all the program and data that are stored in the storage 9.

The processor 10 includes an arithmetic processor. The arithmetic processor includes, for example, a central processing unit (CPU), a system-on-a-chip (SoC), a micro control unit (MCU), a field-programmable gate array (FPGA), and a co-processor; however, the arithmetic processor is not limited thereto. The processor 10 integrally controls operations of the electronic device 1 to implement various functions.

Specifically, referring to the data stored in the storage 9 if necessary, the processor 10 executes instructions contained in the program that is stored in the storage 9. The processor 10 controls a function unit according to the data and instructions, thereby implementing various functions. The function unit includes, for example, the display 2A, a communication unit 6, the receiver 7, the microphone 8, the speaker 11, the cameras 12 and 13; however, the function unit is not limited thereto. The processor 10 can change control according to the result of detection performed by the detector. The detector includes, for example, the touch screen 2B, the button 3, the illuminance sensor 4, the proximity sensor 5, the microphone 8, the cameras 12 and 13, the acceleration sensor 15, the orientation sensor 16, and the gyroscope 17; however, the detector is not limited thereto.

The processor 10 executes the basis program that is stored in the storage 9, thereby enabling realization of various types of control on operations of the electronic device 1. The processor 10, for example, is able to execute various types of control, such as changing information displayed on the display 2A, according to the gesture that is determined based on the result of detection performed by the touch screen 2B. The processor 10 is able to adjust the brightness of the display 2A, based on the result of detection performed by the illuminance sensor 4. The processor 10 is able to invalid an operation on the touch screen 2B based on the result of detection performed by the proximity sensor 5. The processor 10 is able to control, for example, communication with an external device that is connected via the connector 14.

The processor 10 executes the control program 9A, thereby enabling, in addition to the above-described various types of control, realization of a process unique to the electronic device 1 of the embodiment in cooperation with various applications. For example, the processor 10 is able to cooperate with the telephone application 9B and, when an incoming call containing a text message is received, acquire a response method corresponding to a keyword contained in the text message from the response method data 9F that is stored in the storage 9 and, according to the acquired response method, execute a process relating to the incoming call.

The speaker 11 outputs, as a sound, a sound signal that is transmitted from the processor 10. The speaker 11, for example, is used to output a call alert sound and music.

The camera 12 is a front-facing camera that captures an image of an object that faces the front face of the electronic device 1. The camera 13 is a rear-facing camera that captures an image of an object that faces the rear face of the electronic device 1.

The connector 14 is a terminal to which another device is connected. The connector 14 may be a USB (Universal Serial Bus), a HDMI (trademark) (High-Definition Multimedia Interface), a MHL (Mobile High-definition Link), a light peak, a Thunderbolt (trademark), a LAN (Local Area Network) connector, or a general-purpose terminal, such as an ear microphone connector. The connector 14 may be a terminal that is designed dedicatedly, such as a Dock connector. The device that is connected to the connector 14 includes, for example, an aircraft, a charger, an external storage, the speaker 11, a communication device, and an information processing device; however, the device is not limited thereto.

The acceleration sensor 15 detects the direction and magnitude of acceleration applied to the electronic device 1. The orientation sensor 16 detects the direction of geomagnetism. The gyroscope 17 detects an angle and an angular velocity of the electronic device 1. The detection results of the acceleration sensor 15, the orientation sensor 16, and the gyroscope 17 are used in combination in order to detect changes of the electronic device 1 in position and attitude.

Figure 4:
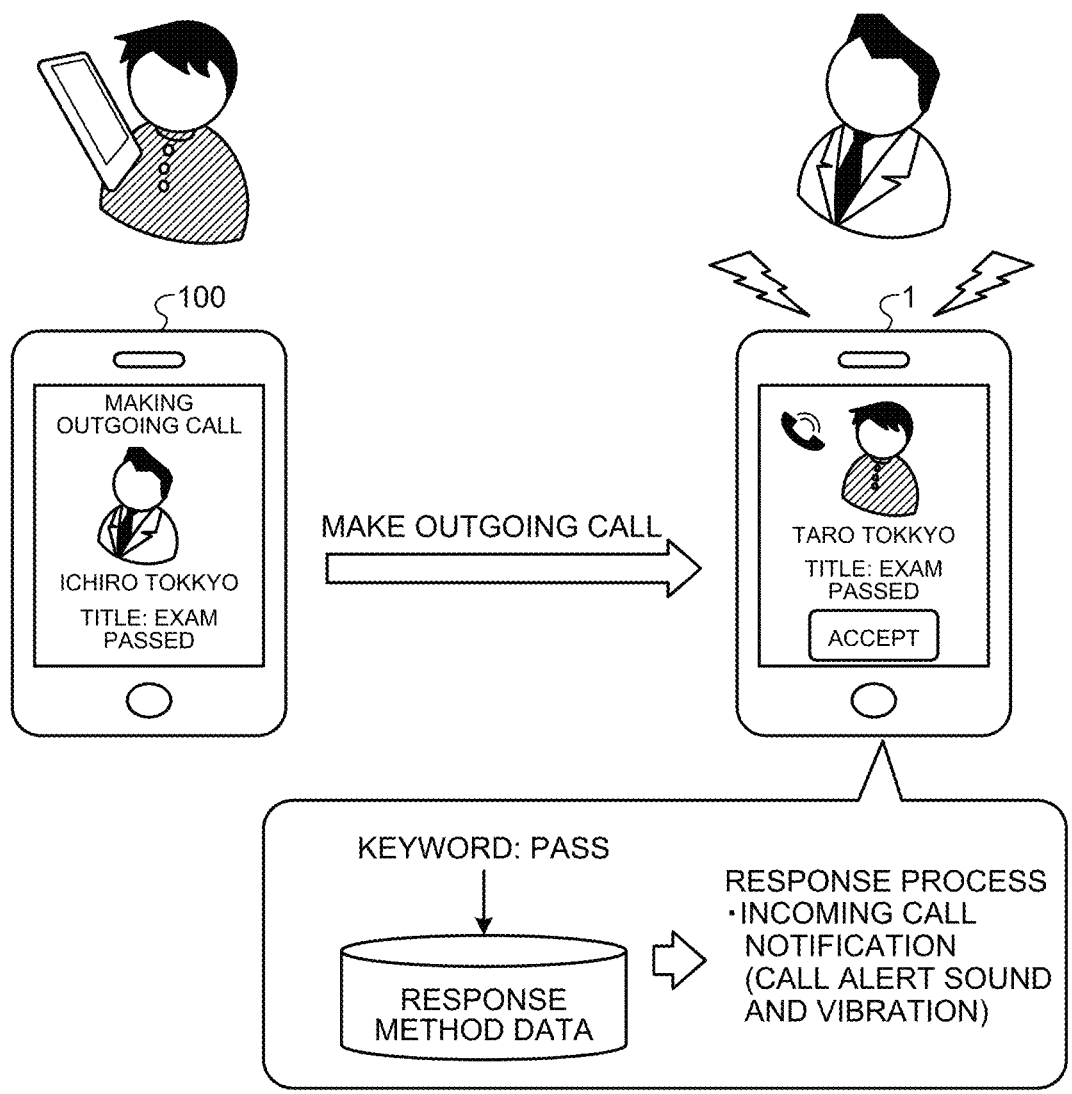
FIG. 4 is a diagram of an exemplary process performed by the electronic device according to the embodiment.
Figure 5:
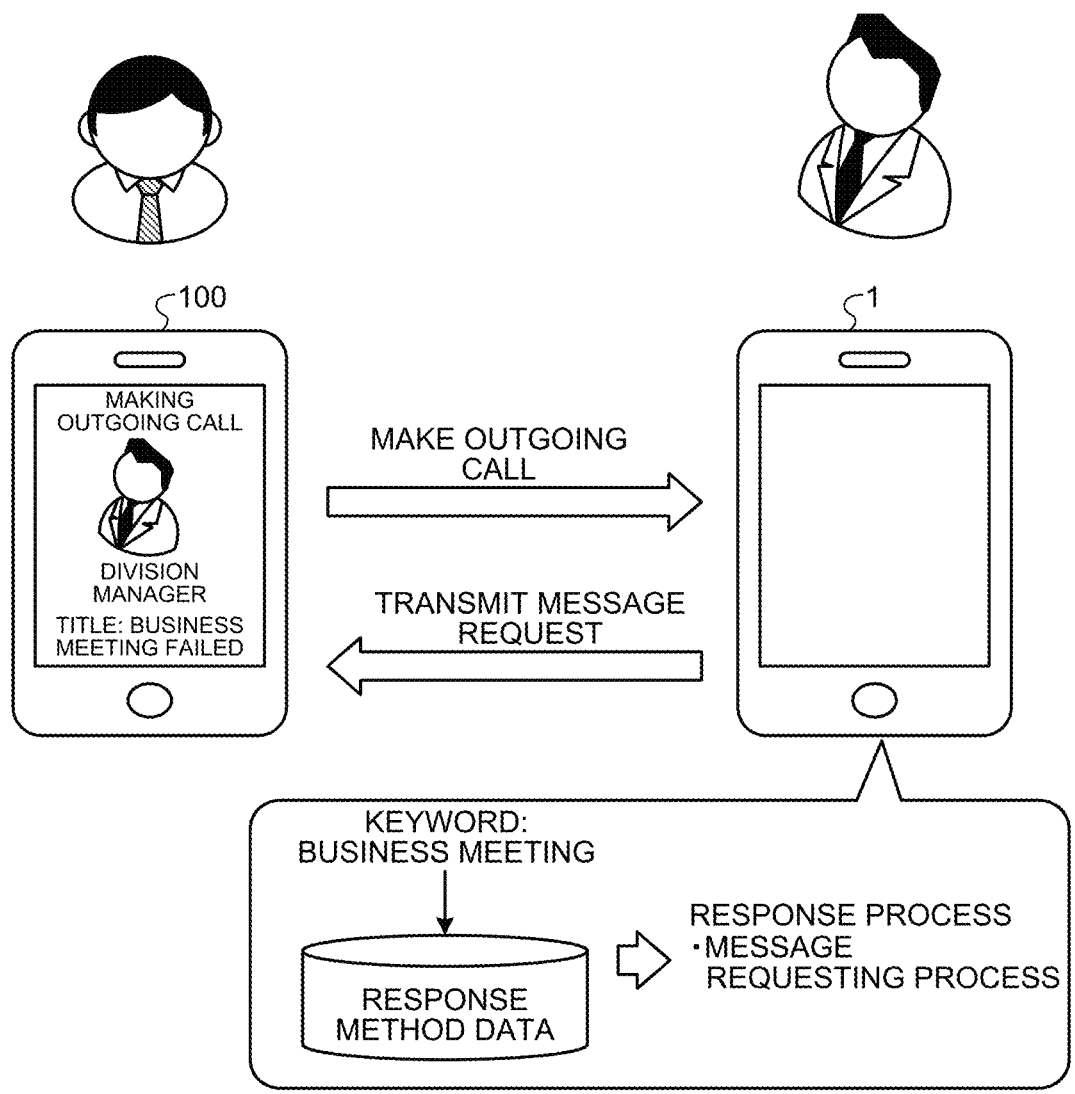
FIG. 5 is a diagram of an exemplary process performed by the electronic device according to the embodiment.
Figure 6:
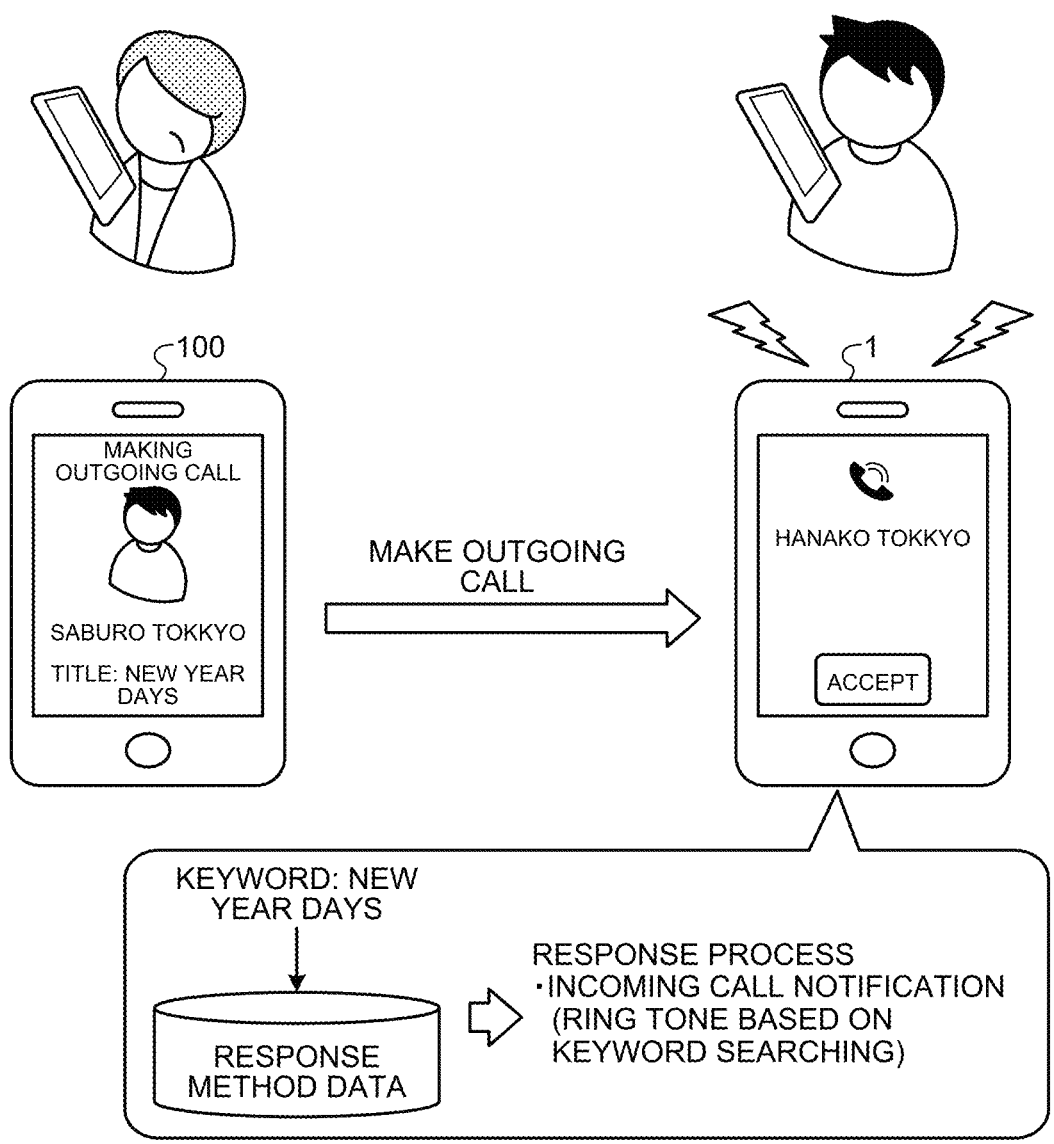
FIG. 6 is a diagram of an exemplary process performed by the electronic device according to the embodiment.

Using FIGS. 4 to 6, an exemplary process performed by the electronic device according to the embodiment will be described. FIGS. 4 to 6 are diagrams of an exemplary process performed by the electronic device according to the embodiment.

FIG. 4 illustrates an exemplary process to execute a normal call process by sounding or moving corresponding to an incoming call according to a response method corresponding to a keyword that is extracted from a text message that is displayed as a talk title on the screen to make a notification indicating that an outgoing call is made.

Specifically, when an incoming call comes in, the electronic device 1 refers to the response method data 9F and acquires a response method that is associated with a keyword "pass" contained in a text message that is displayed as a talk title. The electronic device 1 determines to make the incoming call notification and executes the call process by sounding or moving (outputting a call alert sound or vibrating) in according to the response method that is acquired from the response method data 9F.

FIG. 5 illustrates an exemplary process performed when the message requesting process is executed without notifying that an incoming call comes in according to a response method corresponding to a keyword that is extracted from a text message that is displayed as a talk title on a screen to make a notification indicating that an outgoing is made.

Specifically, when an incoming call comes in, the electronic device 1 refers to the response method data 9F and acquires a response method that is associated with a keyword "business meeting" that is contained in a text message that is displayed as a talk title. The electronic device 1 determines not to make the incoming call notification and does not make a notification indicating that an incoming call comes in according to the response method that is acquired from the response method data 9F. The electronic device 1 executes the message requesting process and transmits a signal representing a message request to the electronic device 100. On receiving the signal representing a message request from the electronic device 1, the electronic device 100 may execute an application enabling transmission of a message by data communication (e.g., the mail application 9C or a chat application) and display a message input screen. The electronic device 100 also may, when executing the application enabling transmission of a message by data communication, automatically specify the electronic device 1 as a device to which a message is transmitted.

FIG. 6 illustrates another exemplary process of executing the normal call process by sounding or moving corresponding to an incoming call according to a response method corresponding to a keyword that is extracted from a text message that is displayed as a talk title on the screen to make a notification indicating that an outgoing call is made.

Specifically, when an incoming call comes, the electronic device 1 refers to the response method data 9F and acquires a response method associated with a keyword "New Year Days" contained in a text message that is displayed as a talk title. The electronic device 1 determines to make the incoming call notification according to the response method that is acquired from the response method data 9F and executes a call process by outputting sound (music obtained by searching with the keyword). The notification mode may include, in addition to the example where sound of music obtained by searching the music data stored in the storage 9 based on the keyword is output, displaying a picture or a video obtained by searching the video image data that is stored in the storage 9 based on the keyword on the touch screen display 2.

Figure 7:
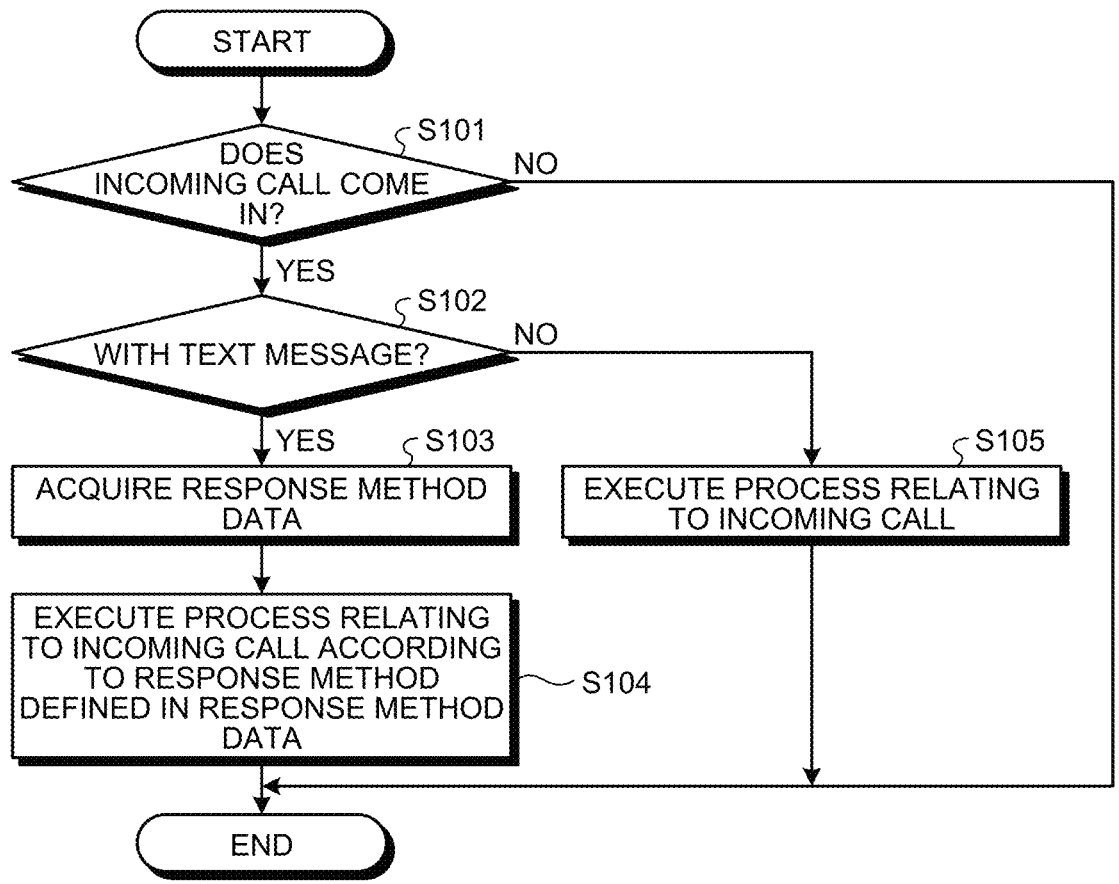
FIG. 7 is a flowchart of an exemplary flow of a process that is executed by the electronic device according to the embodiment.

Using FIG. 7, a flow of a process performed by the electronic device according to the embodiment will be described. FIG. 7 is a flowchart of an exemplary flow of a process performed by the electronic device according to the embodiment. The process illustrated in FIG. 7 is implemented by the processor 10 by executing the control program 9A, or the like.

As illustrated in FIG. 7, the processor 10 determines whether an incoming call comes in (step S101).

When an outgoing call is made according to the determination result (YES at step S101), the processor 10 determines whether a text message is contained in the outgoing call (step S102).

When a text message is contained according to the determination result (YES at step S102), the processor 10 acquires the response method data 9F from the storage 9 (step S103).

The processor 10 executes a process relating to the incoming call according to a response method that is defined in the response method data 9F (step S104) and ends the process illustrated in FIG. 7.

At step S102, when no text message is contained according to the determination result (NO at step S102), the processor 10 executes a process relating to the incoming call (step S105) and ends the process illustrated in FIG. 7.

At step S101, when there is no outgoing call according to the determination result (NO at step S101), the processor 10 ends the process illustrated in FIG. 7.

As described above, when a text message is contained in an incoming call, the electronic device 1 according to the embodiment executes a process relating to the incoming call according to a response method that is defined in the response method data 9F. For this reason, the electronic device 1 is able to allow the user of the electronic device 1 to easily and promptly recognize the purpose of the incoming call before the talk begins and thus, as for convenience to users, it is possible to improve the process performed by the receiver device.

ANOTHER EMBODIMENT

The electronic device 1 according to the above-described embodiment is not limited to the above-described embodiment. In other words, various modifications of the electronic device 1 may be made within the scope of the electronic device 1. Another embodiment of the electronic device 1 will be described below.

Figure 8:
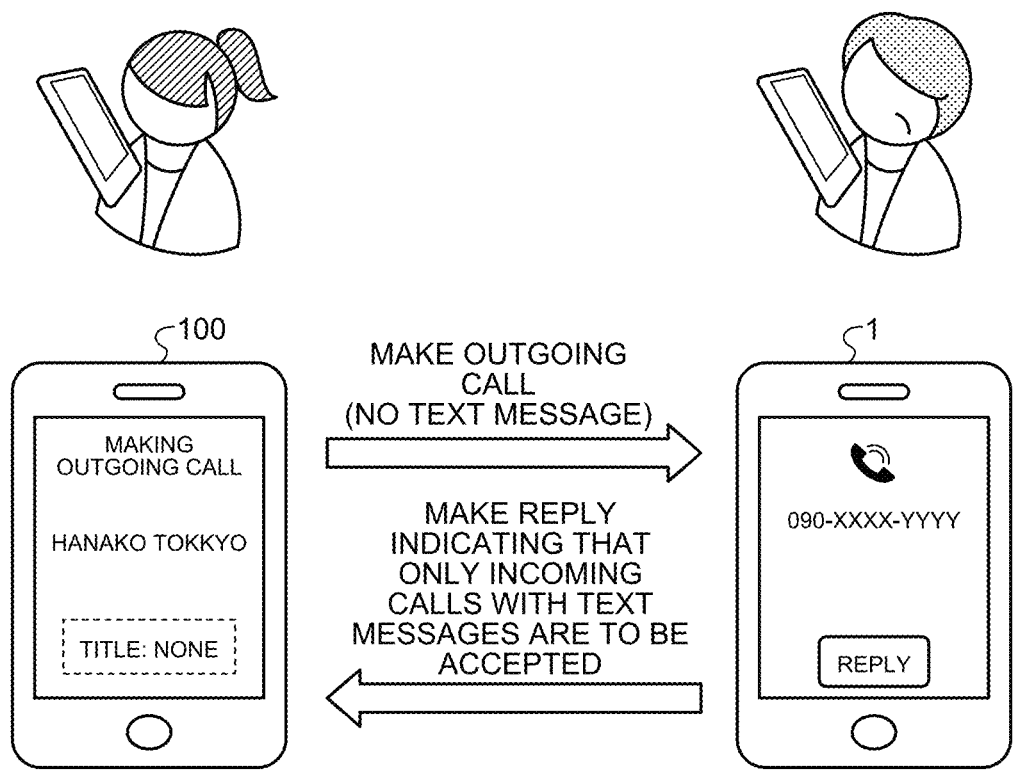
FIG. 8 is a diagram of an exemplary process performed by an electronic device according to another embodiment.

FIG. 8 is a diagram of an exemplary process performed by an electronic device according to another embodiment. As illustrated in FIG. 8, when an incoming call containing no text message comes in, the electronic device 1 may make a reply indicating that only incoming calls with text messages are to be accepted to the electronic device 100 that is the caller.

In order to implement the process illustrated in FIG. 8, the functions that are provided by the control program 9A may include a function of, when no text message is contained in an incoming call, making a reply indicating that only incoming calls containing text messages are to be accepted to the caller. The process of making a reply indicating that only incoming calls containing text messages are to be accepted may be performed by transmitting setting information defining that only incoming calls containing text messages are to be accepted to the caller as a reply.

The setting data 9Z is able to store setting information defining that only incoming calls containing text messages are to be accepted.

The processor 10 executes the control program 9A, thereby enabling execution of a process of, when no text message is contained in an incoming call, making a reply indicating that only incoming calls containing text messages are to be accepted to the caller having made the call.

Figure 9:
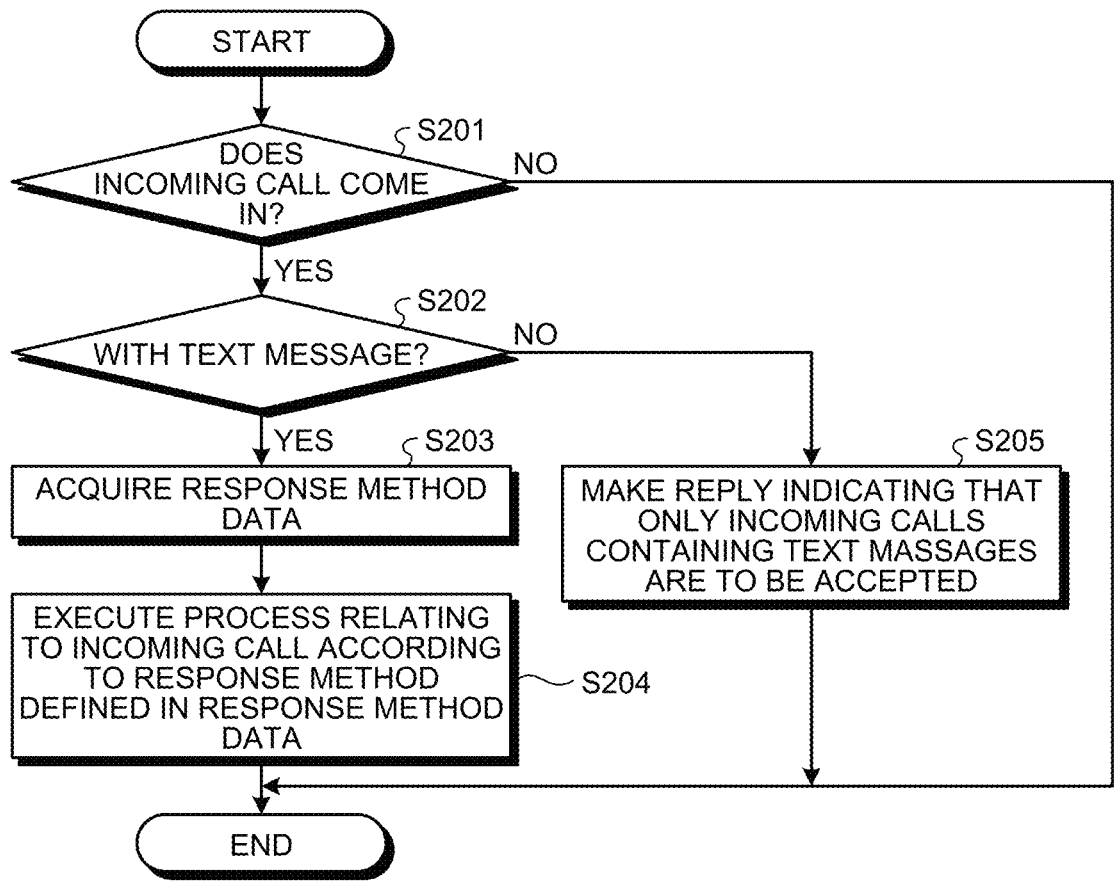
FIG. 9 is a flowchart of an exemplary flow of a process that is executed by the electronic device according to the embodiment.

FIG. 9 is a flowchart of a flow of a process performed by the electronic device 1 according to another embodiment. The process illustrated in FIG. 9 is implemented by the processor 10 executing the control program 9A or the like. As described below, the process performed by the electronic device 1 according to another embodiment differs in step S205 from the process illustrated in FIG. 7.

In other words, as illustrated in FIG. 9, the processor 10 determines whether an incoming call comes in (step S201).

When an outgoing call is made according to the determination result (YES at step S201), the processor 10 determines whether a text message is contained in the outgoing call (step S202).

When a text message is contained according to the determination result (YES at step S202), the processor 10 acquires the response method data 9F from the storage 9 (step S203).

The processor 10 executes a process relating to the incoming call according to a response method that is defined in the response method data 9F (step S204) and ends the process illustrated in FIG. 9.

At step S202, when no text message is contained according to the determination result (NO at step S202), the processor 10 makes a reply indicating that only incoming calls containing text messages are to be accepted to the caller (step S205) and ends the process illustrated in FIG. 9.

At step S201, when no outgoing call is made according to the determination result (NO at step S201), the processor 10 ends the process illustrated in FIG. 9.

As described above, when no text message is contained in an outgoing call, the electronic device 1 is able to make a reply indicating that only incoming calls containing text messages are to be accepted to the caller. For this reason, the electronic device 1 allows the user of the electronic device 1 to be freed from inconvenience due to incoming calls not specifying the purpose.

Although the embodiments of the present disclosure have been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An electronic device, comprising:
a display;
a communication unit;
a storage configured to store response method data in which pre-set keywords and response methods corresponding to incoming calls are associated with each other; and
a processor configured to, when an incoming call containing a text message comes in,
acquire the response method data that is stored in the storage, and
execute a process relating to the incoming call according to a response method that is defined in the acquired response method data,
wherein the response method contains
a mode in which a notification is made when an incoming call comes in, and content of a response process performed when an incoming call comes in, and wherein the processor is configured to, when another incoming call that does not contain the text message comes in and only a caller's phone number is displayed on the display, make a reply, to the caller's phone number, indicating that only incoming calls containing text messages are to be received.

2. The electronic device according to claim 1, wherein, the processor is configured to, when the incoming call containing the text message comes in and the text message includes a predetermined text string, not make a notification, cause another electronic device of a caller, from which the incoming call comes, to execute an application that enables transmission of a message by data communication, and specify the electronic device as a device to which the message is to be transmitted.

3. A control method executed by an electronic device including a display, a communication unit, and a storage, the method comprising:

when an incoming call containing a text message comes in, acquiring response method data in which pre-set keywords and response methods corresponding to incoming calls are associated with each other and that is stored in the storage; and executing a process relating to the incoming call according to a response method that is defined in the acquired response method data, wherein the response method contains a mode in which a notification is made when an incoming call comes in, and content of a response process performed when an incoming call comes in, and wherein the method further includes, when another incoming call that does not contain the text message comes in and only a caller's phone number is displayed on the display, making a reply, to the caller's phone number, indicating that only incoming calls containing text messages are to be received.

4. A non-transitory storage medium that stores a control program for causing, when executed by an electronic device including a display, a communication unit, and a storage, the electronic device to execute:

when an incoming call containing a text message comes in, acquiring response method data in which pre-set keywords and response methods corresponding to incoming calls are associated with each other and that is stored in the storage; and executing a process relating to the incoming call according to a response method that is defined in the acquired response method data, wherein the response method contains a mode in which a notification is made when an incoming call comes in, and content of a response process performed when an incoming call comes in, and wherein when the incoming call containing the text message comes in and the text message includes a predetermined text string, the non-transitory storage medium causes the electronic device to not make a notification, cause another electronic device of a caller, from which the incoming call comes, to execute an application that enables transmission of a message by data communication, and specify the electronic device as a device to which the message is to be transmitted.

* * * * *